United States Patent
Hatano

(10) Patent No.: US 10,151,128 B2
(45) Date of Patent: Dec. 11, 2018

(54) TORQUE HINGE

(71) Applicant: Sugatsune Kogyo Co., Ltd., Tokyo (JP)

(72) Inventor: Yuuichi Hatano, Tokyo (JP)

(73) Assignee: SUGATSUNE KOGYO CO., LTD., Tokyo (JP)

( * ) Notice: Subject to any disclaimer, the term of this patent is extended or adjusted under 35 U.S.C. 154(b) by 0 days.

(21) Appl. No.: 15/792,586

(22) Filed: Oct. 24, 2017

(65) Prior Publication Data

US 2018/0112447 A1    Apr. 26, 2018

(30) Foreign Application Priority Data

Oct. 24, 2016    (JP) ................ 2016-207440

(51) Int. Cl.
| | | |
|---|---|---|
| *E05D 11/08* | (2006.01) | |
| *E05D 5/12* | (2006.01) | |
| *G06F 1/16* | (2006.01) | |
| *E05D 3/12* | (2006.01) | |
| *E05D 11/10* | (2006.01) | |
| *E05D 5/10* | (2006.01) | |

(52) U.S. Cl.
CPC ............ *E05D 11/084* (2013.01); *E05D 3/12* (2013.01); *E05D 5/128* (2013.01); *G06F 1/1616* (2013.01); *G06F 1/1681* (2013.01); *E05D 11/1014* (2013.01); *E05D 11/1078* (2013.01); *E05D 2005/106* (2013.01); *E05Y 2900/20* (2013.01); *E05Y 2900/606* (2013.01); *Y10T 16/54038* (2015.01)

(58) Field of Classification Search
CPC ............ E05D 11/084; E05D 11/1014; E05D 11/1078; E05D 11/082; E05D 11/087; E05D 5/128; E05D 5/12; E05D 2005/106; E05Y 2900/20; E05Y 2900/606; G06F 1/1616; G06F 1/1681; Y10T 16/5403; Y10T 16/54038
USPC ............ 16/337, 342; 361/679.27; 455/575.3; 379/433.13

See application file for complete search history.

(56) References Cited

U.S. PATENT DOCUMENTS

| | | | | | |
|---|---|---|---|---|---|
| 5,697,125 A | * | 12/1997 | Gannon | ................ | E05D 11/082 16/342 |
| 5,896,622 A | * | 4/1999 | Lu | ........................ | G06F 1/1616 16/331 |

(Continued)

FOREIGN PATENT DOCUMENTS

JP    2000-501149 A    2/2000

*Primary Examiner* — William L Miller
(74) *Attorney, Agent, or Firm* — Masuvalley & Partners

(57) ABSTRACT

Provided is a torque hinge which can be easily assembled. A torque hinge includes a restricting member 3 having a hole 31, a shaft 4 passed through the hole 31 of the restricting member 3, a friction member 6 engaged with the shaft 4 in an interference fitting state so as to generate torque due to friction to the shaft 4 which relatively rotates and fitted in the hole 31 of the restricting member 6, and a fixing shaft 41 for unrotatably fixing the friction member 6 to the restricting member 3, the fixing shaft 41 intervening between the friction member 6 and the restricting member 3. The fixing shaft 41 presses a wedge-shaped rotation locking portion 44 of the friction member 6 onto an inner surface of the hole 31 of the restricting member 3.

3 Claims, 6 Drawing Sheets

(56) References Cited

U.S. PATENT DOCUMENTS

| | | | | |
|---|---|---|---|---|
| 5,950,281 | A * | 9/1999 | Lu | G06F 1/1616 |
| | | | | 16/337 |
| 6,170,120 | B1 * | 1/2001 | Lu | G06F 1/1616 |
| | | | | 16/331 |
| 6,301,748 | B1 * | 10/2001 | Su-Man | G06F 1/1616 |
| | | | | 16/337 |
| 6,467,129 | B1 * | 10/2002 | Bae | B60J 3/0265 |
| | | | | 16/308 |
| 7,257,863 | B2 * | 8/2007 | Horng | E05D 5/12 |
| | | | | 16/342 |
| 7,607,202 | B1 * | 10/2009 | Lee | G06F 1/1616 |
| | | | | 16/342 |
| 7,690,081 | B2 * | 4/2010 | Chern, Jr. | G06F 1/1616 |
| | | | | 16/342 |
| 7,735,198 | B2 * | 6/2010 | Petermann | F16M 11/06 |
| | | | | 16/340 |
| 8,230,554 | B2 * | 7/2012 | Chu | E05D 11/087 |
| | | | | 16/337 |
| 8,245,356 | B2 * | 8/2012 | Chu | G06F 1/1681 |
| | | | | 16/342 |
| 8,875,348 | B2 * | 11/2014 | Kossett | G06F 1/1681 |
| | | | | 16/342 |
| 9,790,720 | B2 * | 10/2017 | Jenum | E05D 11/082 |
| 2002/0144378 | A1 * | 10/2002 | Liao | G06F 1/1616 |
| | | | | 16/342 |
| 2007/0094845 | A1 * | 5/2007 | Chang | G06F 1/1616 |
| | | | | 16/342 |
| 2007/0101543 | A1 * | 5/2007 | Lu | G06F 1/1616 |
| | | | | 16/342 |
| 2014/0059805 | A1 * | 3/2014 | Krahn | G06F 1/1681 |
| | | | | 16/342 |
| 2015/0071735 | A1 * | 3/2015 | Jenum | E05D 11/082 |
| | | | | 411/517 |

* cited by examiner

TORQUE HINGE

This application claims priority under 35 U.S.C. § 119 to Japanese patent application Serial No. 2016-207440, filed Oct. 24, 2016, which is incorporated herein by reference in its entirety.

FIELD OF INVENTION

The present invention relates to a torque hinge for generating torque due to friction to a shaft which relatively rotates with respect to a restricting member.

BACKGROUND OF THE INVENTION

A torque hinge is used for holding a movable body with respect to a fixed body with keeping an arbitrary opening angle and/or absorbing impact when the movable body is opened or closed. For example, the torque hinge is used in an electronic device such as a notebook computer for holding a display (movable body) with respect to a computer main body (fixed body) with keeping an arbitrary opening angle. In addition to the electronic device, the torque hinge can be used for allowing a door or a cover of a furniture or a vehicle to be an openable-closable type or for allowing a table or a counter to be a foldable type.

As such a torque hinge, patent document 1: JP 2000-501149A discloses a torque hinge including a restricting member having a hole, a shaft passed through the hole of the restricting member and a friction member engaged with the shaft in an interference fitting state and unrotatably fixed to the hole of the restricting member.

In the torque hinge of the patent document 1: JP 2000-501149A, the restricting member is coupled to a fixed body and the shaft is coupled to a movable body. When the movable body rotates, the shaft rotates together with the movable body. At this time, since rotation of the friction member is limited by the restricting member, the shaft rotates with respect to the friction member. Since the friction member is engaged with the shaft in the interference fitting state, torque due to friction is generated to the shaft which relatively rotates. Thus, it is possible to hold the movable body with keeping an arbitrary opening angle.

SUMMARY OF THE INVENTION

However, in the torque hinge described in the patent document 1, the friction member is press-fitted in the hole of the restricting member for fixing the friction member to the restricting member. Thus, there is a problem that it takes time and effort to assemble the torque hinge.

Therefore, it is an object of the present invention to provide a torque hinge which can be easily assembled and a producing method for the torque hinge.

In order to solve the above-described problem, one aspect of the present invention is a torque hinge comprising a restricting member having a hole, a shaft passed through the hole of the restricting member, a friction member engaged with the shaft in an interference fitting state so as to generate torque due to friction to the shaft which relatively rotates and fitted in the hole of the restricting member, and a fixing shaft for unrotatably fixing the friction member to the restricting member, the fixing shaft intervening between the friction member and the restriction member.

Another aspect of the present invention is a producing method for a torque hinge, the producing method comprising fitting a friction member into a hole of a restricting member, inserting a fixing shaft for unrotatably fixing the friction member to the restriction member between the friction member and the restricting member, and passing a shaft through the friction member in an interference fitting state so as to generate torque due to friction to the shaft which relatively rotates.

According to the present invention, since the friction member can be fitted into the hole of the restricting member in a state that a space exists in the hole of the restricting member, it is easy to insert the friction member into the hole of the restricting member. Since the fixing shaft intervenes between the restricting member and the friction member, it is possible to unrotatably fix the friction member to the restricting member.

BRIEF DESCRIPTION OF DRAWINGS

FIG. 2B shows a position at the time when the torque hinge rotates from the closed position toward an opening direction by 90 degrees, FIG. 2C shows an opened position and FIG. 2D shows a position at the time when the torque hinge rotates from the opened position toward a closing direction by 90 degrees).

DETAILED DESCRIPTION OF THE PREFERRED EMBODIMENT

Hereinafter, detailed description will be given to a torque hinge according to an embodiment of the present invention based on the accompanying drawings. In this regard, the torque hinge of the present invention can be embodied in various aspects and is not limited to the embodiment described in this specification. This embodiment is provided with intent to sufficiently provide the disclosure of this specification for facilitating a person having ordinary skill in the art to sufficiently understand the scope of the present invention.

Figure 1:
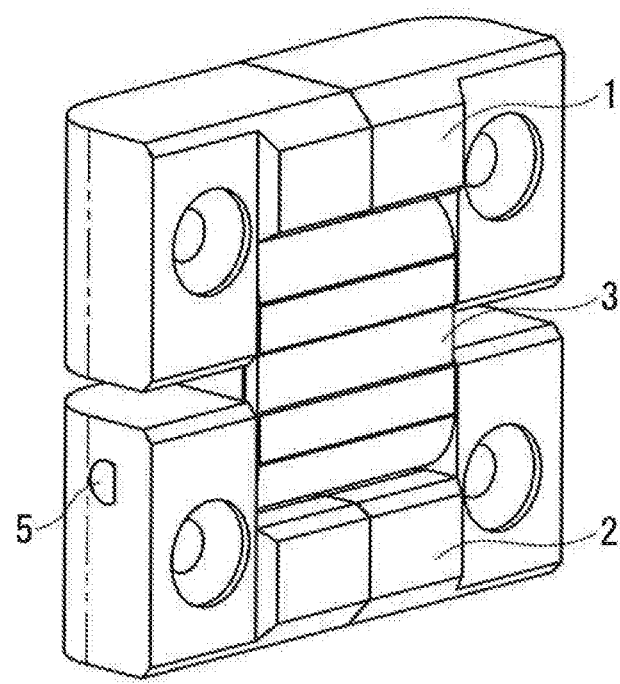
FIG. 1 is an external perspective view of a torque hinge according to one embodiment of the present invention.

FIG. 1 shows an embodiment in which the torque hinge of the present invention is applied to a two-shaft hinge. The torque hinge according to this embodiment includes a first main body 1, an intermediate body 3 as a restricting member and a second main body 2. The intermediate body 3 is coupled to the first main body 1 so that the intermediate body 3 can rotate around a first shaft 4 (see FIG. 3). The second main body 2 is coupled to the intermediate body so that the second main body 2 can rotate around a second shaft 5 (see FIG. 3). The first shaft 4 and the second shaft 5 are in parallel with each other. The first main body 1 should be attached to a movable body. The second main body 2 should be attached to a fixed body.

Figure 2:
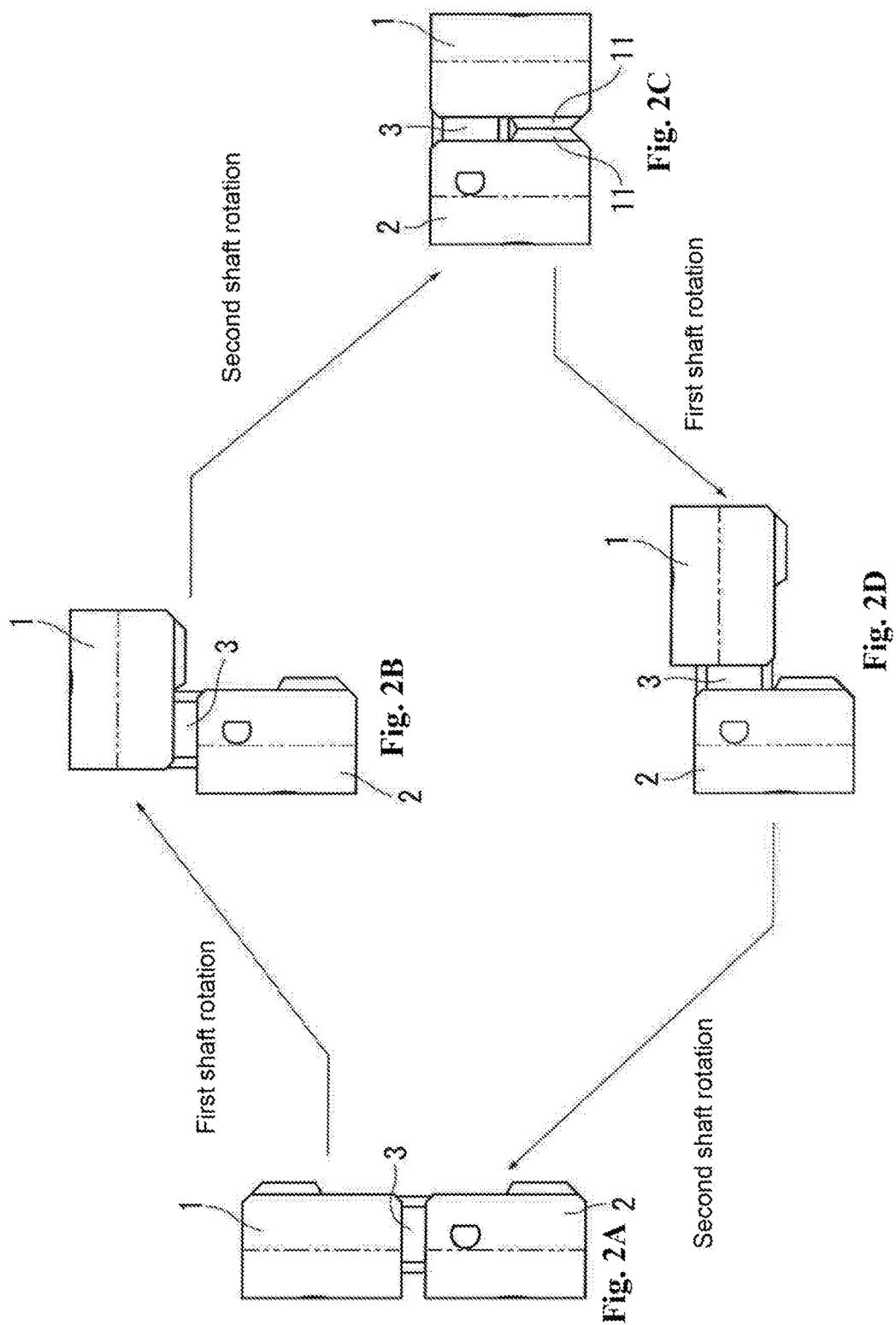
FIGS. 2A through 2D show an operation diagram of the torque hinge according to this embodiment (FIG. 2A) shows a closed position.

FIGS. 2A through 2D show an operation diagram of the torque hinge at the time of opening and closing the movable body. Torque generated to the first shaft 4 due to friction is set to be smaller than torque generated to the second shaft 5 due to friction. Thus, when the movable body at a closed position shown in FIG. 2A is opened (in other words, when the first main body 1 is rotated in the clockwise direction), the first main body 1 first rotates with respect to the intermediate body 3 by 90 degrees as shown in FIG. 2B and then the intermediate body 3 rotates with respect to the second main body 2 by 90 degrees as shown in FIG. 2C. At an opened position of the movable body shown in FIG. 2C, a stopper 11 of the first main body 1 makes contact with a stopper 11 of the second main body 2.

On the other hand, when the movable body at the opened position shown in FIG. 2C is closed (in other words, when the first main body 1 is rotated in the counter-clockwise direction), the first main body 1 first rotates with respect to the intermediate body 3 by 90 degrees as shown in FIG. 2D and then the intermediate body 3 rotates with respect to the second main body 2 by 90 degrees as shown in FIG. 2A. At the closed position of the movable body shown in FIG. 2A, the first main body 1 and the second main body 2 make contact with the intermediate body 3.

Figure 3:
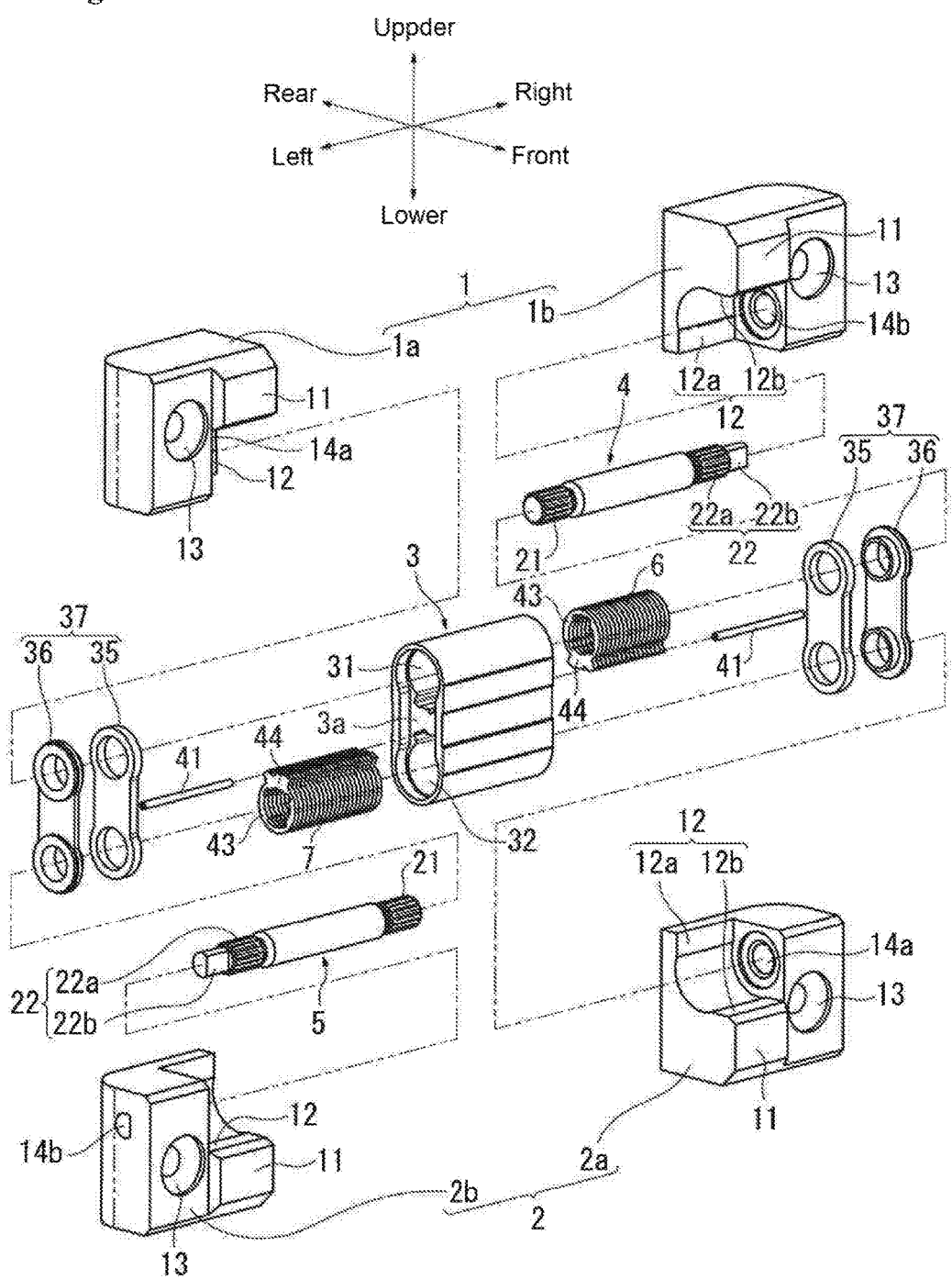
FIG. 3 is an exploded perspective view of the torque hinge according to this embodiment.

FIG. 3 shows an exploded perspective view of the torque hinge. A reference sign 1 represents the first main body, a reference sign 2 represents the second main body, a reference sign 3 represents the intermediate body, a reference sign 4 represents the first shaft, a reference sign 5 represents the second shaft, a reference sign 6 represents laminated first friction plates and a reference sign 7 represents laminated second friction plates. In this regard, for the purpose of illustration, a configuration of the torque hinge is explained in the following description with using directions seen from a direction perpendicular to a vertical plane on which the torque hinge at the closed position is located, that is with using the upper-lower direction, the left-right direction and the front-rear direction in FIGS. 2A through 2D. Of course, an arrangement of the torque hinge is not limited to such an arrangement.

The first main body 1 is constituted of a pair of first divided bodies 1a, 1b divided into two. Each of the first divided bodies 1a, 1b is formed into a substantially rectangular parallelepiped shape as a whole and a cutout 12 for avoiding an interference with the intermediate body 3 is formed in a corner of each of the first divided bodies 1a, 1b. A hole 13 through which a fastening member such as a screw for attaching each of the first divided bodies 1a, 1b to the movable body is formed in each of the first divided bodies 1a, 1b. The cutout 12 includes a first bottom surface 12a and a second bottom surface 12b perpendicular to each other. Each of the first divided bodies 1a, 1b can rotate with respect to the intermediate body 3 in the range of about 90 degrees. The protruding stopper 11 is formed on a front surface of each of the first divided bodies 1a, 1b.

Both end portions of the first shaft 4 in an axial direction thereof are unrotatably and respectively supported by the first divided bodies 1a, 1b. Rotation locking portions 21, 22 are respectively formed on the both end portions of the first shaft 4 in the axial direction thereof by knurling process, for example. Each of the rotation locking portions 21, 22 is constituted of a plurality of protruded lines and/or groove lines formed on an outer circumferential surface of the first shaft 4 and extending in the axial direction of the first shaft 4. As the rotation locking portion 22, a flat portion 22b is also formed on the other end portion of the first shaft 4 in addition to a knurling-processed portion 22a.

A hole 14a into which the one end portion of the first shaft 4 is inserted is formed on the first divided body 1a. A rotation locking portion having a shape corresponding to the one end portion of the first shaft 4 is formed in the hole 14a. A hole 14b into which the other end portion of the first shaft 4 is inserted is formed on the first divided body 1b. A rotation locking portion having a shape corresponding to the other end portion of the first shaft 4 is formed in the hole 14b. By respectively inserting the rotation locking portions 21, 22 respectively formed on the both end portions of the first shaft 4 into the first divided bodies 1a, 1b, the first shaft 4 becomes impossible to rotate with respect to the first main body 1 in both of the clockwise direction and the counter-clockwise direction.

The second main body 2 is also constituted of a pair of second divided bodies 2a, 2b divided into two. The second divided body 2a has the same shape as the first divided body 1a and the second divided body 2b has the same shape as the first divided body 1b. The same reference signs as the portions of the first divided bodies 1a, 1b are respectively attached to corresponding portions of the second divided bodies 2a, 2b and detailed description for each portion of the second divided bodies 2a, 2a is omitted.

The second shaft 5 also has the same shape as the first shaft 4. The same reference signs as the portions of the first shaft 4 are respectively attached to corresponding portions of the second shaft 5 and detailed description for each portion of the second shaft 5 is omitted.

Figure 4:
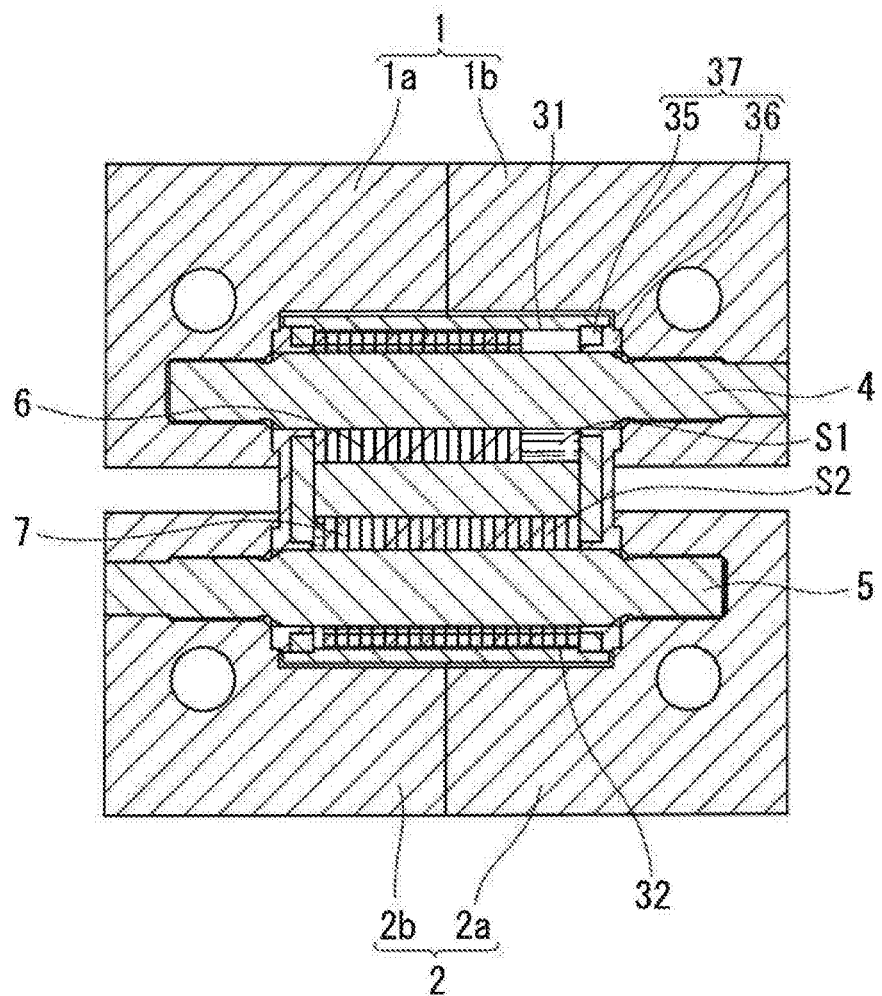
FIG. 4 is a vertical cross-sectional view of the torque hinge according to this embodiment.

The intermediate body 3 as the restricting member is formed into a horizontally long rectangular parallelepiped shape as a whole and formed into a shape whose upper and lower ends are rounded. A hole 31 through which the first shaft 4 is passed and in which the first friction plates 6 as the friction member are contained is formed in the intermediate body 3. Further, a hole 32 through which the second shaft 5 is passed and in which the second friction plates 7 as the friction member are contained is formed in the intermediate body 3. Concave portions 3a are respectively formed on both end surfaces of the intermediate body 3 in an axial direction thereof. Covers 37 for closing the holes 31, 32 are respectively fitted into these concave portions 3a. As shown in the cross-sectional view of FIG. 4, a first containing portion S1 is defined by the hole 31 and the covers 37. A second containing portion S2 is defined by the hole 32 and the covers 37.

As shown in FIG. 3, each of the covers 37 includes a metallic portion 35 and a resin portion 36. Each of the metallic portion 35 and the resin portion is formed into a vertically long plate-like shape corresponding to the concave portion 3a on the end surface of the intermediate body 3. Holes through which the first shaft 4 and the second shaft 5 are respectively passed are formed in each of the metallic portion 35 and the resin portion 36.

As shown in FIG. 3, two or more first friction plates 6 are unrotatably contained in the hole 31. The first friction plates 6 are laminated in the axial direction of the first shaft 4. Torque which is proportional to the number of the laminated first friction plates 6 is generated to the first shaft 4 which relatively rotates. Two or more second friction plates 7 are unrotatably contained in the hole 32. The second friction plates 7 are laminated in the axial direction of the second shaft 5. Torque which is proportional to the number of the laminated second friction plates 7 is generated to second shaft 5 which relatively rotates.

Figure 5A:
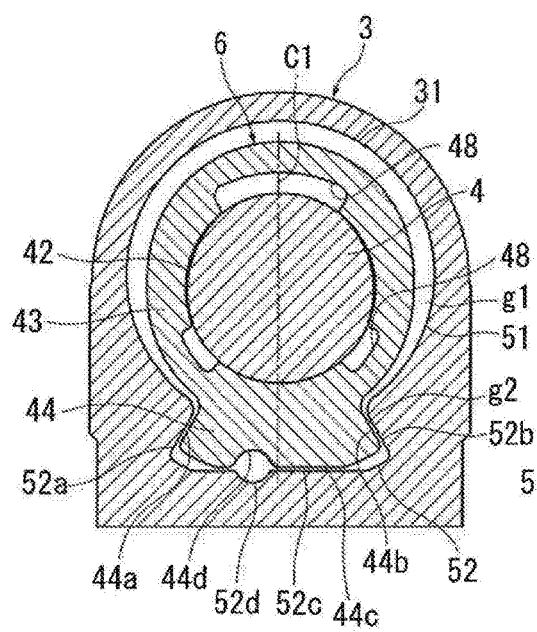
FIGS. 5A and 5B are detailed views showing a first friction plate fitted in a hole of an intermediate body (FIG. 5A shows a state before a pin is inserted and FIG. 5B shows a state after the pin is inserted).
Figure 5B:
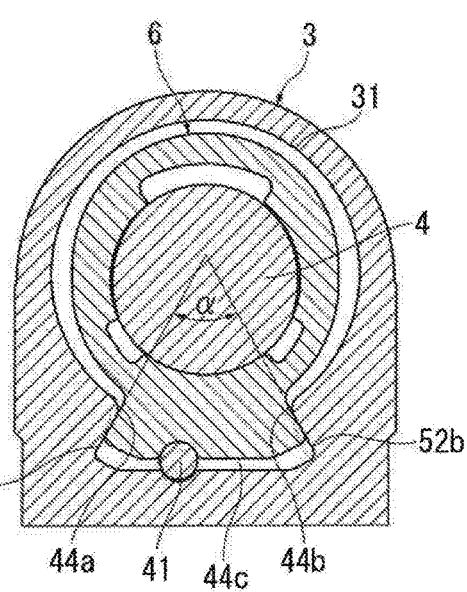

FIGS. 5A and 5B show the first friction plate 6 contained in the hole 31 of the intermediate body 3. FIG. 5A shows a state before a pin 41 as a fixing shaft is inserted and FIG. 5B shows a state after the pin 41 is inserted. The first friction plate 6 has a surrounding portion 43 defining a shaft opening portion 42 through which the first shaft 4 is passed and a wedge-shaped rotation locking portion 44 integrally formed with the surrounding portion 43. The first friction plate 6 is produced by using punching process with respect to a thin plate.

The surrounding portion 43 has a ring shape. An inner diameter of the surrounding portion 43 is smaller than an outer diameter of the first shaft 4. The surrounding portion 43 is engaged with the first shaft 4 in an interference fitting state. A plurality of cutouts 48 are formed in an inner surface of the surrounding portion 43 in a circumferential direction thereof. In this regard, it is also possible to form a slit in the surrounding portion 43 (in other words, the surrounding portion 43 can be constituted of a pair of arc-shaped arms or the surrounding portion 43 can be formed into a hook shape).

The rotation locking portion 44 has a wedge shape. A pair of inclined outer surface 44a, 44b are formed on the rotation locking portion 44 so that a lateral width of the rotation locking portion 44 gradually increases as it is separated away from the surrounding portion 43. An angle formed by the inclined outer surfaces 44a, 44b is a (see FIG. 5B). The inclined outer surfaces 44a, 44b lead to a bottom surface 44c. In the bottom surface 44c, a cutout 44d is formed at a position shifting from an imaginary center line C1 of the first friction plate 6 toward the left direction in an axial direction view. The first friction plate 6 is bilaterally symmetric except the cutout 44d.

When the first friction plate 6 is produced by using the punching word, a central portion of the first friction plate 6 convexly expands. By forming the cutout 44d at the position shifting from the imaginary center line C1, it becomes easier to laminate the first friction plates 6 with aligning orientations of the convex portions of the first friction plates 6.

As shown in FIG. 5A, the hole 31 has a cylindrical portion 51 and a square pole portion 52 continuing to the cylindrical portion 51 and having a trapezoid cross-sectional surface. An inner surface of the cylindrical portion 51 has a cylindrical shape having a radius larger than an outer diameter of the surrounding portion 43. A space g1 is opened between the inner surface of the cylindrical portion 51 and the outer surface of the surrounding portion 43.

The square pole portion 52 has a pair of inclined inner surfaces 52a, 52b inclined with respect to each other. An inner surface of the square pole portion 52 has a square pole shape having a trapezoid cross-sectional surface larger than the rotation locking portion 44. A space g2 is opened between the inner surface of the square pole portion 52 and the outer surface of the rotation locking portion 44. An angle α formed by the inclined inner surfaces 52a, 52b is equal to the angle formed by the inclined outer surfaces 44a, 44b (see FIG. 5B). The inclined inner surfaces 52a, 52b lead to a bottom surface 52c. In the bottom surface 52c, a cutout 52d is formed at a position shifting from the imaginary center line C1 of the hole 31 in the left direction. The hole 31 is bilaterally symmetric except the cutout 52d.

As shown in FIG. 5A, the first friction plates 6 are fitted into the hole 31 in a state that the spaces g1, g2 exist in the hole 31. After the first friction plates 6 are fitted into the hole 31, the pin 41 is inserted between the cutouts 44d, 52d. With this operation, the inclined outer surfaces 44a, 44b of the rotation locking portion 44 are respectively pressed onto the inclined inner surfaces 52a, 52b of the hole 31 and thus the first friction plates 6 are unrotatably fixed to an inner surface of the hole 31 of the intermediate body 3.

Here, since the rotation locking portion 44 of each of the first friction plates 6 has the wedge shape and the first friction plates 6 are supported at three points, that is the pin 41 and the inclined inner surfaces 52a, 52b, it is possible to stably hold the first friction plates 6 at a fixed position. The first shaft 4 is supported in the first friction plates 6. Thus, it is possible to also stably hold this first shaft 4 at a fixed position.

A shape of the second friction plate 7 is identical to the shape of the first friction plate 6. A shape of the hole 32 is also identical to the shape of the hole 31. The second friction plates 7 are also fixed to an inner surface of the hole 32 by the pin 41 as is the case with the first friction plates 6.

As shown in FIG. 3, the hole 31 and the hole 32 are closed by the covers 37 after the first friction plates 6 and the second friction plates 7 are fixed to the intermediate body 3. After that, the first shaft 4 is passed through the first friction plates 6 and the covers 37 and the second shaft 5 is passed through the second friction plates 37 and the covers 7. After that, the first divided bodies 1a, 1b divided into two are respectively attached to the both end portions of the first shaft 4 and the second divided bodies 2a, 2b divided into two are respectively attached to the both end portions of the second shaft 5.

Figure 6A:
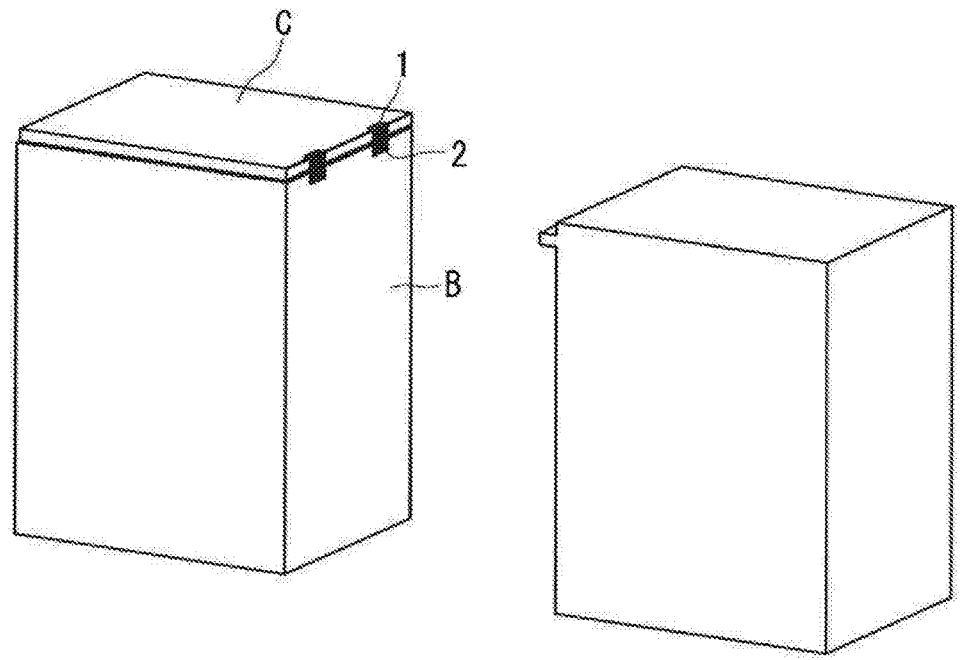
FIGS. 6A and 6B are views showing an example in which the torque hinge of the present invention is applied to a trap type counter (FIG. 6A shows a closed position of the trap type counter and FIG. 6B shows an opened position of the trap type counter).
Figure 6B:
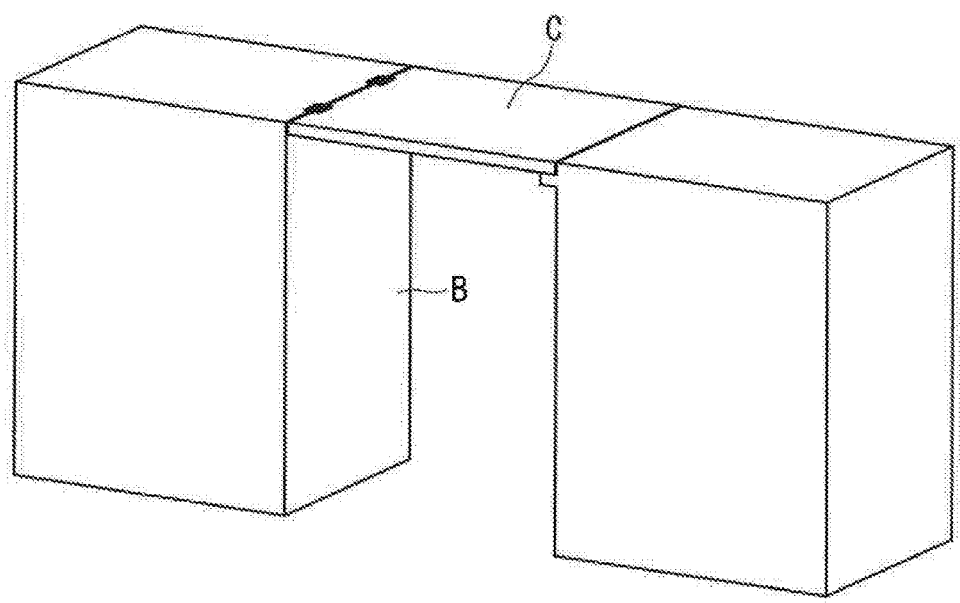

FIGS. 6A and 6B show an example in which the torque hinge according to this embodiment is applied to a trap type counter. FIG. 6A shows a closed position (a folded position) of the trap type counter and FIG. 6B shows an opened position (a flat position) of the trap type counter. As shown in FIG. 6A, the first main body 1 is attached to an end surface of a trap type counter C. The second main body 2 is attached to an end surface of a counter main body B.

Since the torque due to the friction is generated to the first shaft 4 and the second shaft 5 when the trap type counter C is opened and when the trap type counter C is closed, it is possible to hold the trap type counter C with keeping an arbitrary opening angle and/or absorb impact when the trap type counter C is opened or closed.

In this regard, the present invention is not limited to the one embodied in the above-described embodiment and the present invention can be modified into various embodiments within a range of not changing the spirit of the present invention.

In the above-described embodiment, although the example in which the torque hinge of the present invention is applied to the two-shaft hinge, the torque hinge of the present invention can be also applied to a one-shaft hinge. In this case, the second friction plates and the second main body become unnecessary. The first main body is coupled to the movable body and the intermediate body is coupled to the fixed body.

In the above-described embodiment, although two or more friction plates are contained in each hole of the intermediate body, one friction plate may be contained in each hole of the intermediate body. Further, one friction member obtained by integrating two or more friction plates may be contained in each hole of the intermediate body.

The torque hinge of the present invention can be applied to a furniture, a vehicle such as a car, an electric device such as a notebook computer and a machine such as a semiconductor producing apparatus and a medical device.

DESCRIPTION OF REFERENCE SIGNS

3 . . . Intermediate body (restricting member)
4 . . . First shaft (shaft)
5 . . . Second shaft (shaft)

6 . . . First friction plate (friction member)
7 . . . Second friction plate (friction member)
31 . . . Hole of intermediate body (hole of restricting member)
32 . . . Hole of intermediate body (hole of restricting member)
41 . . . Pin (fixing shaft)
42 . . . Shaft opening portion
43 . . . Surrounding portion
44 . . . Wedge-shaped rotation locking portion
44$a$ . . . Inclined outer surface of rotation locking portion
44$b$ . . . Inclined outer surface of rotation locking portion
52$a$ . . . Inclined inner surface of hole of intermediate body
52$b$ . . . Inclined inner surface of hole of intermediate body
52$c$ . . . Bottom surface of hole of intermediate body
C1 . . . Imaginary center line of friction plate in axial direction view
g1 . . . Space
g1 . . . Space

What is claimed is:

1. A torque hinge, comprising:

a restricting member having a hole;

a shaft passed through the hole of the restricting member;

a friction member engaged with the shaft in an interference fitting state so as to generate torque due to friction to the shaft which relatively rotates and fitted in the hole of the restricting member, and a fixing shaft for unrotatably fixing the friction member to the restricting member, said fixing shaft, which is an independent part from each of the friction member and the shaft, is intervening between the friction member and the restricting member;

wherein an inner surface of the hole of the restricting member has a pair of inclined inner surfaces inclined with respect to each other, and wherein the fixing shaft presses the friction member onto the pair of inclined inner surfaces of the restricting member.

2. The torque hinge claimed in claim 1, wherein the friction member has a surrounding portion defining a shaft opening portion through which the shaft is passed and a wedge-shaped rotation locking portion integrally formed with the surrounding portion, and wherein the fixing shaft presses the wedge-shaped rotation locking portion onto the pair of inclined inner surfaces of the restricting member, and wherein the fixing shaft is arranged between a bottom surface leading to the pair of inclined inner surfaces of the restricting member and the rotation locking portion of the friction member.

3. A torque hinge, comprising:

a restricting member having a hole;

a shaft passed through the hole of the restricting member;

a friction member engaged with the shaft in an interference fitting state so as to generate torque due to friction to the shaft which relatively rotates and fitted in the hole of the restricting member, and a fixing shaft for unrotatably fixing the friction member to the restricting member, said fixing shaft, which is an independent part from each of the friction member and the shaft, is intervening between the friction member and the restricting member, wherein the friction member is a friction plate formed by punching process, the friction member is a lamination of two or more friction plates, and forms a cutout engaged with the fixing shaft at a position shifting from an imaginary center line of the friction plate in an axial direction view.

* * * * *